March 1, 1932. E. F. LARSON 1,847,772
TIRE SPREADER
Filed July 15, 1929
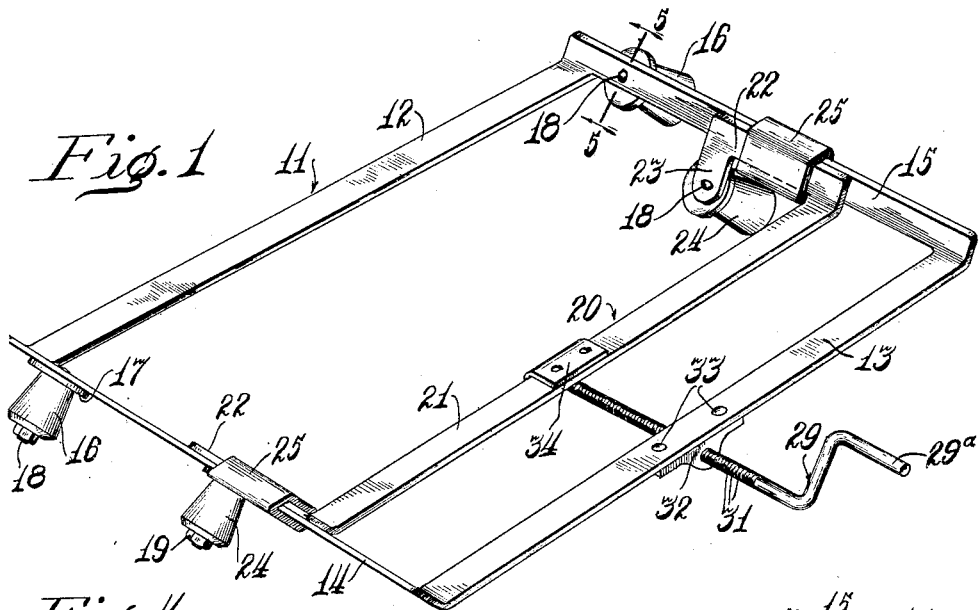
Inventor.
Elmer Frank Larson
Daniel Brennan
Attorney.

Patented Mar. 1, 1932

1,847,772

UNITED STATES PATENT OFFICE

ELMER FRANK LARSON, OF GOTHAM, WISCONSIN

TIRE SPREADER

Application filed July 15, 1929. Serial No. 378,325.

The invention relates to improvements in tire spreaders and particularly to a novel tool for spreading the side walls of a tire casing preparatory to inserting a shoe, or effecting other minor repairs.

It is an object of the invention to provide a novel tool for spreading and retaining the side walls of a tire casing apart to permit access to the interior.

Another object of the invention resides in the provision of a novel spreader for a tire casing which may be readily attached to or detached from said casing.

It is still another object of the invention to provide a novel spreader for tire casings which is light in weight and of durable construction, having means thereon for effecting the spreading of the side walls of the tire casing with little manual effort.

A further object of the invention is to provide a novel tool for spreading the side walls of tire casings, of such construction, that when applied to a casing it spreads it sufficiently to permit ready access to the interior thereof.

The foregoing and such other objects of the invention as will appear hereinafter as the description proceeds will be more readily understood from a perusal of the following specification, reference being had to the accompanying drawings, in which:

Fig. 1 is a perspective view of the improved tire spreader.

Fig. 2 is a front elevational view of the tire spreader, a portion of a tire casing being shown.

Fig. 3 is an end elevational view of the tire spreader shown applied to a tire casing.

Fig. 4 is a detailed sectional view of the mounting for the end of the crank rod, showing a fragment of the crank and slide.

Fig. 5 is a longitudinal sectional view through one of the knobs, taken on line 5—5 of Fig. 1.

Fig. 6 is a sectional view taken on line 6—6 of Fig. 3.

Owing to the rigidity of the side walls of tire casings for pneumatic tires, it is difficult to spread said walls sufficiently and to hold them spread apart to permit inspection of the inner lining or to properly place a reinforcing member, or shoe, therein.

The novel tire spreader, embodying the features of this invention, is particularly adapted to be carried as part of the tool equipment in vehicles, but it may also be used efficiently by service station attendants in the absence of more expensive and cumbersome apparatus.

The device, in general, comprises a frame provided with extensions adapted for engaging one of the side walls of a tire casing, and having a slidable member mounted thereon having similar projections for engaging the other side wall of the casing. Suitable operating means is provided whereby the slidable member is moved relative to the frame, for spreading, or permitting contraction of the side walls of the tire casing.

Referring to the drawings, in detail, a substantially rectangular skeleton frame member 11 is provided, said frame preferably being formed of metal, or the like, having side members 12 and 13 and end members 14 and 15. The end members 14 and 15 are preferably bent upwardly and outwardly above the plane of the frame, as shown. Rotatably mounted on and extending perpendicular outwardly from each of the end members 14 and 15, adjacent the side member 12, is an extension or roller 16. These rollers may be of any suitable construction but it is preferable that they be formed substantially cylindrical with an annular flange 17 on their upper end. The rollers 16 are each freely mounted on the end members by a stud 18, which is preferably rigid in said end members and extends through a longitudinal bore in said rollers. A nut 19, threaded on the end of the stud 18, holds the roller in place.

A slide 20 is mounted for transverse movement on the skeleton frame 11, said slide comprising a cross-member 21 having portions 22 adjacent its ends formed to extend parallel with the end members 14 and 15 of said frame. The end portions 22 of the slide are also inclined upwardly and outwardly to lie within and on the end members 14 and 15. An ear 23 is provided on each end portion 22 of the slide 21, said ears extending downwardly and inwardly below the frame 11, and each of said ears has a roller 24, like rollers 16, rotatably secured thereto by a stud 18. The slide 21 is slidably secured to frame 11 by straps 25, which are folded about the overlying parallel portions 22 of the slide and end members 14, as shown in detail in Fig. 6.

When the side walls (Fig. 3) 27 and 27' of the tire casing 28 are to be spread apart, to permit access to the interior of said tire casing, the rollers 16 and 24 are inserted in the casing between the beads 28. Upon urging the slide 21 away from the side member 12 of the rectangular frame 11, rollers 16 and 24 will engage respectively the side walls 27 and 27' of the tire casing and spread them apart. To facilitate movement of the slide 21 relative to the frame 11 and to hold said sides in expanded position, a crank 29 is provided.

Crank 29 is provided with threads 31 having threaded engagement with a tapped opening in a bracket 32 secured on the underside of the side member 13 of the frame 11, midway between the end members 14 and 15, in any suitable manner, such as by rivets 33. The end of the crank 29 extending outwardly from the frame 11 has an operating handle 29a, while the other end is reduced and extends through a suitable bearing 34 rigidly secured on and extending below the slide 21. A pin 35, inserted through the end of the crank 29 prevents its withdrawal from the bearing 34. The operation of the device is such that upon rotating the crank 29 the slide 21 will be moved laterally towards or away from the longitudinal side member 12 and with the rollers 16 and 24 inserted between the side walls 27 and 27' of the tire casing, the latter are spread apart or permitted to resume their normal contracted position depending upon the direction of rotation of the crank.

The device provides a very practical tire spreader, the use of which permits ready access to be had to the interior of the tire casing, the rectangular skeleton frame 11 of said spreader affording ample working space within the confines of said frame, when the slide 21 is drawn towards the side member 13. The provision of the rollers 16 and 24 allows the tire spreader to be slid around the inner periphery of the tire casing, thus spreading the side walls by successive stages, to facilitate thorough inspection of the lining without readjusting the slide 21 on the frame 11. As the device is compact it can be carried in a vehicle with other tools, thus making it a practical tool for use while repairing tire casings while on the road, or otherwise out of contact with a repair shop.

While the preferred embodiment of the invention has been illustrated and described in detail, it is to be understood that the invention is capable of embodying various modifications in structural detail without departing from the spirit of the invention or the scope of the appended claims.

I claim:

1. An article of the class described adapted to spread the side walls of a tire casing and to hold them expanded, having in combination, a substantially rectangular skeleton frame provided with side and end members, an opposite disposed downwardly and outwardly extending roller on each of said end members adapted to engage the same inner side of said casing, a slide mounted on said frame, a roller on each end of said slide extending downwardly and outwardly below the frame and arranged for cooperation with the first mentioned rollers and adapted to engage the inner side of the opposite side wall of the tire casing, and means for moving said slide to effect the spreading of said side walls.

2. An article of the class described adapted to spread the side walls of a tire casing and to hold them expanded, comprising a substantially rectangular skeleton frame having side and end members, a roller extending downwardly and outwardly from each end member of said frame, adjacent the same side member, adapted to engage the inside of one of the side walls of the tire casing, a slide mounted on the end members of said frame, rollers on said slide for engaging the inside of the other side wall of said tire casing, and manually operable means connecting said frame and said slide for moving the latter to spread the side walls of said tire casing.

3. An article of the class described adapted for spreading the side walls of a tire casing and holding them expanded, comprising, a substantially rectangular skeleton frame having upwardly and outwardly inclined end members and horizontal side members, rollers extending outwardly of and perpendicular from said inclined end members adjacent one side member of the frame, a slide mounted for lateral movement on said frame, said slide having its ends extending parallel with the inclined end members of said frame, a roller on each end of said slide extending outwardly and downwardly below said end members of said frame, and means associated with said slide and said frame for moving the former to spread the walls of said tire casing when the rollers are inserted therebetween.

4. A device of the character described, comprising, a substantially rectangular skeleton frame having side members and upwardly and outwardly inclined end members, a slide mounted on the end members in parallelism with the side members of said frame, means on said frame and said slide for engaging the inner side of the side walls of a tire casing, and means for moving said slide relative to the frame to effect distention of said side walls.

5. In a device of the character described, comprising a substantially rectangular skeleton frame having side and end members, means adjacent one of its side members for engaging the inside of one of the side walls of a tire casing, a slide mounted on and extending longitudinally within the rectangular frame, means on the slide for engaging the inside of the other wall of the tire casing, and screw means for moving the tire casing engaging means apart to spread the side walls of the tire casing.

6. A tire spreader, having in combination, a substantially rectangular skeleton frame, means mounted thereon for engaging the inside of one of the side walls of a tire casing, a slide mounted on said frame, means on said slide adapted to engage the other side wall of the tire casing, and means associated with said rectangular frame and said slide for moving one relative to the other to spread or permit contraction of said side walls.

7. A tire spreader, having in combination, a substantially rectangular skeleton frame, downwardly outwardly extending rollers mounted thereon adapted to engage the inside of one of the side walls of a tire casing, a slide mounted on said frame, rollers on said slide for engaging the inside of the other side wall, and means associated with said rectangular frame and said slide for moving one relative to the other to spread or permit contraction of said side walls.

8. A tire spreader, having in combination, a substantially rectangular skeleton frame having side and end members, downwardly outwardly extending rollers mounted thereon adapted to engage the inside of one of the side walls of a tire casing, a slide mounted on said rectangular frame, means on said slide for engaging the other side wall of said tire casing, a bracket on said frame having a tapped opening therein for receiving a crank, one end of said crank being rotatably secured to the slide whereby, upon manipulation of said crank, said slide is moved relative to the frame to spread or permit contraction of said walls.

9. A device of the character described, comprising, a rectangular skeleton frame having side and end members, a longitudinally disposed slide mounted on, and having its ends extending parallel with, the end members of of said frame, straps embracing the parallel members of said slide and said frame for slidingly securing the frame and slide together, rollers on said frame for engaging the inner side of one of the side walls of a tire casing, rollers on the slide adapted to engage the inner side of the other wall of the tire casing, and manually operable means for moving said slide laterally whereby the side walls of the tire casing are spread or permitted to resume their normal contracted position.

In testimony whereof I affix my signature at Gotham, Wisconsin.

ELMER FRANK LARSON.